United States Patent
Aggarwal et al.

(10) Patent No.: US 11,425,636 B1
(45) Date of Patent: Aug. 23, 2022

(54) NETWORK FUNCTION SERVICE SUBSCRIPTION CONTROL

(71) Applicant: Nokia Technologies Oy, Espoo (FI)

(72) Inventors: Chaitanya Aggarwal, Munich (DE); Saurabh Khare, Bangalore (IN); Anja Jerichow, Grafing bei München (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/232,640

(22) Filed: Apr. 16, 2021

(51) Int. Cl.
| | |
|---|---|
| *H04W 48/16* | (2009.01) |
| *H04W 8/20* | (2009.01) |
| *H04W 12/08* | (2021.01) |
| *H04W 48/18* | (2009.01) |

(52) U.S. Cl.
CPC ............ *H04W 48/16* (2013.01); *H04W 8/20* (2013.01); *H04W 12/08* (2013.01); *H04W 48/18* (2013.01)

(58) Field of Classification Search
CPC ....... H04W 48/16; H04W 48/18; H04W 8/20; H04W 12/08
See application file for complete search history.

(56) References Cited

U.S. PATENT DOCUMENTS

| | | | | |
|---|---|---|---|---|
| 10,785,652 | B1 * | 9/2020 | Ravindranath | H04W 12/069 |
| 11,317,321 | B1 * | 4/2022 | Paczkowski | H04W 24/02 |
| 2020/0007335 | A1 * | 1/2020 | Tan | H04L 9/3247 |
| 2022/0103644 | A1 * | 3/2022 | Park | H04L 67/16 |

OTHER PUBLICATIONS

"3rd Generation Partnership Project;Technical Specification Group Services and System Aspects;Study on security aspects of enablers for Network Automation (eNA) for the 5G system (5GS) Phase 2;(Release 17)", 3GPP TR 33.866, V0.4.0, Mar. 2021, pp. 1-30.

"3rd Generation Partnership Project;Technical Specification Group Services and System Aspects;Security architecture and procedures for 5G system(Release 17)", 3GPP TS 33.501, V17.0.0, Dec. 2020, pp. 1-253.

(Continued)

*Primary Examiner* — Wayne H Cai
(74) *Attorney, Agent, or Firm* — Nokia Technologies Oy

(57) ABSTRACT

According to an example aspect, there is provided a method, comprising: receiving, from a first network function consumer, a subscribe request for a second network function consumer to subscribe to a service, wherein the subscribe request comprises a notification address and identifies the second network function consumer, transmitting, to a network repository function, an access token request, comprising the notification address and identifying the second network function consumer, receiving, from the network repository function, an access token response comprising an access token comprising the notification address verified by the network repository function, transmitting, to the second network function consumer, an authorization request for receiving data authorization and comprising the access token, receiving, from the second network function consumer, an authorization response indicative of authorization of the second network function consumer, and transmitting, on the basis of the authorization response, a notification to the second network function consumer.

20 Claims, 6 Drawing Sheets

(56) References Cited

OTHER PUBLICATIONS

"3rd Generation Partnership Project;Technical Specification Group Services and System Aspects;System architecture for the 5G System (5GS);Stage 2 (Release 16)", 3GPP TS 23.501, V16.7.0, Dec. 2020, pp. 1-450.
Indian Application No. 202041014737, "Improved Authorization in Communication Networks", filed on Apr. 2, 2020, 33 pages.
"3rd Generation Partnership Project;Technical Specification Group Core Network and Terminals;5G System; Network Function Repository Services;Stage 3 (Release 17)", 3GPP TS 29.510, V17.0.0, Dec. 2020, pp. 1-229.
"3rd Generation Partnership Project;Technical Specification Group Services and System Aspects;Study on enhanced security aspects of the 5G Service BasedArchitecture (SBA); (Release 17)", 3GPP TR 33.875, V0.1.0, Jan. 2021, pp. 1-12.
Hardt, "The OAuth 2.0 Authorization Framework", RFC 6749, Internet Engineering Task Force (IETF), Oct. 2012, pp. 1-76.

* cited by examiner

NETWORK FUNCTION SERVICE SUBSCRIPTION CONTROL

FIELD

The present disclosure relates to controlling network function service subscription and provision in communication networks.

BACKGROUND

In networks supporting wireless or wire-based communication, discovering network functions, NFs, and network function services is of interest as many network function instances may be virtualized and be of a dynamic nature. Core network, CN, entities may seek to discover a set of one or more NF instances and NF service instances for a specific NF service or an NF type. Examples of such CN entities include NFs and service communication proxies, SCPs. Examples of NF instances to be discovered include application functions, gateways and subscriber data repositories, and also application related functions, for example for vertical industry support, or entertainment. Further examples include a resource control or management function, a session management or control function, an interworking, data management or storage function, an authentication function or a combination of one or more of these functions. NF service instances, known also as NF services, include individual services provided by an NF. One NF may be configured to provide more than one service, wherein each of the more than one service may be reachable using a different approach, such as a different address or port or communication protocol.

NF service discovery may be enabled via a NF discovery procedure, as specified for wireless communication networks in technical specifications established by the third generation partnership project, 3GPP, or GSMA, GSM association, for example. A network repository function NRF may be configured to act as a service access authorization server, and provide a (service-consuming) network function consumer, or an SCP acting on behalf of the network function consumer, with a cryptographic access token authorizing the network function consumer to use the service provided by a (service-providing) network function producer.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to: receive, from a first network function consumer, a subscribe request for a second network function consumer to subscribe to a service, wherein the subscribe request comprises a notification address and identifies the second network function consumer, transmit, to a network repository function, an access token request for an access token for requesting authorization from the second network function consumer, wherein the access token request comprises the notification address and identifies the second network function consumer, receive, from the network repository function, an access token response comprising an access token comprising the notification address verified by the network repository function, transmit, to the second network function consumer, an authorization request for receiving data authorization, wherein the authorization request comprises the access token comprising the notification address, receive, from the second network function consumer, an authorization response indicative of authorization of the second network function consumer, and transmit, on the basis of the authorization response, a notification to the second network function consumer.

According to a second aspect of the present disclosure, there is provided a method, which may be performed by a network function service provider entity, the method comprising: receiving, from a first network function consumer, a subscribe request for a second network function consumer to subscribe to a service, wherein the subscribe request comprises a notification address and identifies the second network function consumer, transmitting, to a network repository function, an access token request for an access token for requesting authorization from the second network function consumer, wherein the access token request comprises the notification address and identifies the second network function consumer, receiving, from the network repository function, an access token response comprising an access token comprising the notification address verified by the network repository function, transmitting, to the second network function consumer, an authorization request for receiving data authorization, wherein the authorization request comprises the access token comprising the notification address, receiving, from the second network function consumer, an authorization response indicative of authorization of the second network function consumer, and transmitting, on the basis of the authorization response, a notification to the second network function consumer.

According to an embodiment of the first or second aspect, or an embodiment thereof, the subscribe request comprises another access token, indicative of authorization of the network repository function for the first network function consumer, or the first network function consumer and the second network function consumer, to receive data from the network function producer, and the access token request is transmitted in response to validating the access token received in the subscribe request.

According to an embodiment of the first or second aspect, or an embodiment thereof, a network function discovery is performed with the network repository function to discover a receiving data authorization service in response to the subscribe request, and apparatus is configured to transmit the access token request after performing the network function discovery, wherein the access token request identifies the receiving data authorization service.

According to a third aspect, there is provided an apparatus comprising at least one processing core, at least one memory including computer program code, the at least one memory and the computer program code being configured to, with the at least one processing core, cause the apparatus at least to receive, from a second network function consumer, a registration request, wherein the registration request comprises an address of the second network function consumer, receive an access token request from a network function provider or the first network function consumer, wherein the access token request comprises a notification address and identifies the second network function consumer, and transmit, in response to the notification address corresponding with the address of the second network function consumer, an access token response to the network function provider or the first network function consumer, for authorizing to send an authorization request for receiving data authorization to the second network function consumer, wherein the access token response comprises an access token comprising the notification address.

According to a fourth aspect there is provided a method, which may be performed by an authorization network entity, such as a network repository function, the method comprising receiving, from a second network function consumer, a registration request, wherein the registration request comprises an address of the second network function consumer, receiving an access token request from a network function provider or the first network function consumer, wherein the access token request comprises a notification address and identifies the second network function consumer, and transmitting, in response to the notification address corresponding with the address of the second network function consumer, an access token response to the network function provider or the first network function consumer, for authorizing to send an authorization request for receiving data authorization to the second network function consumer, wherein the access token response comprises an access token comprising the notification address.

According to an embodiment of the third or fourth aspect, an access token request is received from the first network function consumer to send a subscribe request to the network function producer on behalf of a second network function consumer to subscribe to a service, the first network function consumer, or the first network function consumer and the second network function consumer, is/are authorized to send the subscribe request to the network function producer, and an access token response is transmitted to the first network consumer in response to the authorization to send the subscribe request, comprising an access token for the subscribe request.

According to a fifth aspect, there is provided an apparatus comprising at least one processing core, at least one memory including computer program code, the at least one memory and the computer program code being configured to, with the at least one processing core, cause the apparatus at least to transmit, from a first subscriber consumer to a network repository function, an access token request for an access token for requesting receiving data authorization from the second network function consumer, wherein the access token request comprises a notification address and identifies the second network function consumer, receive, from the network repository function, an access token response comprising an access token comprising the notification address verified by the network repository function, transmit, to the second network function consumer, a subscribe request for a second network function consumer to subscribe to a service, wherein the authorization request comprises the access token comprising the notification address.

According to a sixth aspect there is provided a method, which may be performed by a (first) network function service consumer entity, the method comprising: transmitting, from a first subscriber consumer to a network repository function, an access token request for an access token for requesting receiving data authorization from the second network function consumer, wherein the access token request comprises a notification address and identifies the second network function consumer, receiving, from the network repository function, an access token response comprising an access token comprising the notification address verified by the network repository function, and transmitting, to the second network function consumer, a subscribe request for a second network function consumer to subscribe to a service, wherein the authorization request comprises the access token comprising the notification address.

The subscribe request may comprise a network function identity of the second network function consumer and the notification address as a uniform resource identifier to identify a receiver of notifications from the network function producer.

According to a seventh aspect, there is provided an apparatus comprising at least one processing core, at least one memory including computer program code, the at least one memory and the computer program code being configured to, with the at least one processing core, cause the apparatus at least to transmit, to a network repository function, a registration request, wherein the registration request comprises an address of a second network function consumer, receive, from a network function provider, an authorization request for receiving data authorization, wherein the authorization request comprises an access token comprising a notification address, and transmit, in response to validating the access token and authorizing data reception from the network function producer, an authorization response to the network function provider.

According to an eight aspect there is provided a method, which may be performed by a (second) network function service consumer entity, the method comprising: transmitting, to a network repository function, a registration request, wherein the registration request comprises an address of a second network function consumer, receiving, from a network function provider, an authorization request for receiving data authorization, wherein the authorization request comprises an access token comprising a notification address, and transmitting, in response to validating the access token and authorizing data reception from the network function producer, an authorization response to the network function provider.

Performing the authorization of the data reception may comprise checking if the second network function consumer has a subscription to the first network function consumer and/or checking if the first network function consumer is allowed to use uniform resource identifier of the second network function consumer.

According to an embodiment of any of the aspects, or an embodiment thereof, the network function producer is a network function service producer, the first network function consumer and the second network function consumer are network function service consumers, and the network repository function is a network repository function of a service based architecture system.

According to an embodiment of any of the aspects, or an embodiment thereof, the access token request further comprises an identifier of the first network function consumer as a source of a uniform resource identifier of the second network function consumer.

According to an embodiment of any of the aspects, or an embodiment thereof, the authorization request identifies a receiving data authorization service, and the access token comprising the notification address identifies at least some of:

the first network function consumer as a source of the uniform resource identifier of the second network function consumer, the network function provider as a consuming network function for the receiving data authorization service, the second network function consumer as a producing network function for the receiving data authorization service, and a uniform resource identifier of the second network function consumer as the notification address to identify a notification receiving network function.

According to some further aspects, there is provided an apparatus, comprising means configured for performing the method of the second aspect, the fourth aspect, the sixth aspect, the eight aspect, or any of the embodiment thereof.

performing the authorization of the data reception comprises checking if the second network function consumer has a subscription to the first network function consumer and/or checking if the first network function consumer is allowed to use uniform resource identifier of the second network function consumer.

According to some further aspects, there is provided a computer program, a computer program product, a computer-readable medium, or a non-transitory computer-readable medium, comprising a set of computer readable instructions that, when executed by at least one processor, cause an apparatus to perform the method of any one of the above aspects, or an embodiment thereof.

EMBODIMENTS

Figure 1:
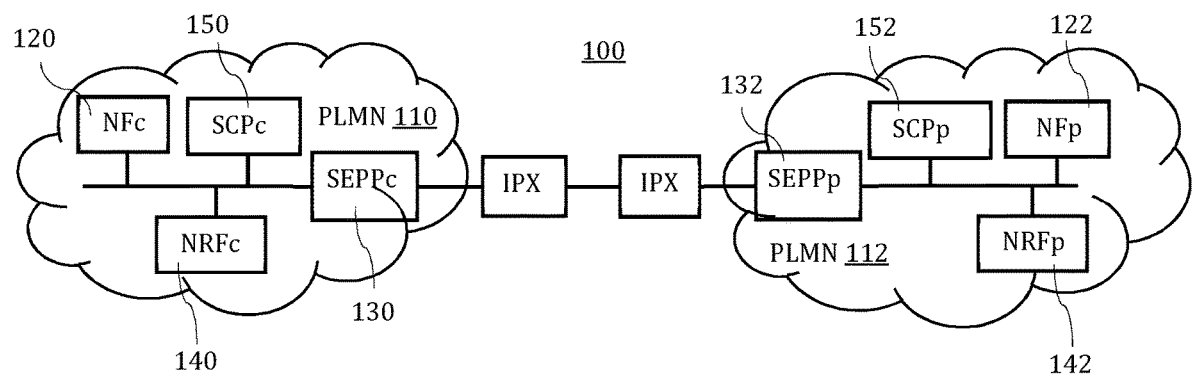
FIG. 1 illustrates an example system in accordance with at least some embodiments.

FIG. 1 illustrates an example system, comprising two public land mobile networks, PLMNs, 110, 112, each equipped with a network function, NF, 120, 122. A network function may refer to an operational and/or a physical entity. A network function may be a specific network node or element, or a specific function or set of functions carried out by one or more entities, such as virtualized network elements, VNFs. One physical node may be configured to perform plural NFs. A network function can be implemented either as a network element on a dedicated hardware, as a software instance running on a dedicated hardware, or as a virtualised function instantiated on an appropriate platform, e.g. on a cloud infrastructure. Examples of such network functions include a resource control or management function, session management or control function, interworking, data management or storage function, authentication function or a combination of one or more of these functions.

In case of 3GPP fifth generation, 5G, system service based architecture, SBA, core network NFs may comprise at least some of an access and mobility management function, AMF, a session management function, SMF, a network slice selection function, NSSF, a network exposure function, NEF, a network repository function, NRF, a unified data management, UDM, an authentication server function, AUSF, a policy control function, PCF, and an application function, AF. The PLMNs may each further comprise a security edge protection proxy, SEPP, 130, 132 configured to operate as a security edge node or gateway. The NFs may communicate with each other using representational state transfer application programming interfaces, for example. These may be known as Restful APIs. Further examples of NFs include NFs related to gaming, streaming or industrial process control. The system may comprise also nodes from 3G or 4G node systems, such as home subscriber server, HSS, and a suitable interworking function for protocol translations between e.g. diameter and REST API Json. While described herein primarily using terminology of 5G systems, the principles of the invention are applicable also to other communication networks using proxies as described herein, such as 4G networks, 6G networks, and non-3GPP networks, for example.

While the example of FIG. 1 has two PLMNs 110, 122, in general at least some embodiments of the invention may be practiced in a single PLMN, which need not necessarily have SEPPs. In an inter-PLMN case, the SEPP 130, 132 is a network node at the boundary of an operator's network that may be configured to receive a message, such as an HTTP request or HTTP response from an NF, to apply protection for sending and to forward the reformatted message through a chain of intermediate nodes, such as IP eXchanges, IPX, towards a receiving SEPP. The receiving SEPP receives a message sent by the sending SEPP and forwards the message towards an NF within its operator's network, e.g. the AUSF.

In the example of FIG. 1, an NF service may be provided for a service-consuming NF by a service-producing NF, henceforth referred to as NFc 120 and NFp 122. They may also be referred to as NF (service) consumer and NF (service) producer, respectively. As noted, the NFc and NFp may reside in the same PLMN or in different PLMNs.

A service communication proxy, SCP, 150, 152 may be deployed for indirect communication between network functions, NFs. An SCP is an intermediate network entity to assist in indirect communication between an NFc and an NFp, including routing messages, such as, for example, control plane messages between the NFs. The SCP may discover and select NFp on behalf of NFc. The SCP may request an access token from the NRF or an Authorization Server on behalf of NFc to access the service of NFp.

NF discovery and NF service discovery enable entities, such as NFc 120 or SCP 150, to discover a set of NF instance(s) and NF service instance(s) for a specific NF service or an NFp type. The NRF 140, 142 may comprise a function that is used to support the functionality of NF and NF service registration, NF and NF service discovery and NF status changes subscription and notification. Additionally or alternatively, the NRF may be configured to act as a service access authorization server. The NRF may maintain an NF profile of available NFp entities and their supported services. The NRF may notify about newly registered, updated, or deregistered NFp entities along with its NF services to a subscribed NFc or SCP. An NRF may thus advise NFc entities or SCP concerning where, that is, from which NFp entities, they may obtain services they need. An NRF may be co-located together with an SCP, for example, run in a same computing substrate. Alternatively, NRF may be in a physically distinct node than an SCP or even hosted by a service provider.

In order for the NFc 120 or SCP 150 to obtain information about the NFp and/or NF service(s) registered or configured in a PLMN/slice, the NFc 120 or SCP 150 may initiate, based on local configuration, a discovery procedure with an NRF, such as NRFc 140. The discovery procedure may be initiated by providing the type of the NFp and optionally a list of the specific service(s) it is attempting to discover. The NFc 120 or SCP 150 may additionally or alternatively provide other service parameters, such as information relating to network slicing.

Direct communication may be applied between NFc 120 and NFp 122 for an NF service, or NF service communication may be performed indirectly via SCP(s) 150, 152. In direct communication, the NFc 120 performs discovery of the target NFp 122 by local configuration or via local NRF, NRFc 140. In indirect communication, the NFc 120 may delegate the discovery of the target NFp 122 to the SCP 150. In the latter case, the SCP may use the parameters provided by NFc 120 to perform discovery and/or selection of the target NFp 122, for example with reference to one or more NRF. In 5G service based interface (SBI) model D, the NFc may delegate the NFp discovery and selection to the SCP and also delegate the service access authorization, i.e. delegate the access token retrieval for accessing the specific NFp's services to the SCP.

It is to be noted that at least some of the entities or nodes 120, 122, 140, 142 may act in both service-consuming and service-providing roles and that their physical structure may be similar or identical, while their role in the present examples in delivery of a particular message or service is identified by use of the prefix/suffix "c" or "p" indicating whether they are acting as the service-consuming or service-producing NF. It is to be noted that instead of "c" and "p", "v" for visited and "h" for home can be used to refer to at least some respective entities in the visited and home PLMNs. In some embodiments, a system implementing an embodiment of the present disclosure comprises both fourth generation, 4G, and fifth generation, 5G, parts.

In general, a network support function such as an NRF may further be configured to act as a service access authorization server, and provide the NFc, or an SCP acting on behalf of the NFc, with a cryptographic access token authorizing the NFc to use the service provided by the NFp. The access token may also be referred to as an authorization token. In general, an NRF is a terminological example of a network support node. In general, an SCP is a terminological example of a proxy entity.

In some embodiments OAuth based service authorization and/or token exchange is applied between NFc and NFp for the purpose of authorizing an NFc to access the service of an NFp. Alternatively to OAuth, another authorization framework may be applied. Thus, a network entity, such as an NRF, may be or perform as an authorization server, AS, such as an OAuth authorization server. The NFc may be an OAuth client and the NFp may operate as OAuth resource server, and they may be configured to support OAuth authorization framework as defined in IETF RFC 6749, for example.

The NFc or SCP may include the access token in a request message when requesting the service from the NFp, for example in an "authorization bearer" header. For example, the NRF may act as an OAuth 2.0 authorization server. The access token may comprise e.g. identifiers of the NFc, NRF and/or NFp, a timestamp and/or an identifier of the specific service which is authorised for the NFc with the access token. The access token may comprise a token identifier of itself, for example a serial number. The token identifier may uniquely identify the token. The access token may be cryptographically signed using a private key of the NRF. A validity of such a cryptographic signature may be verified using the corresponding public key of the NRF, which the NFp (or another entity validating the access token) may obtain in connection with registering with the NRF the service(s) it offers, for example. When the NFc contacts the NFp, it may present the access token, which the NFp may then verify, for example at least in part by using its copy of the public key of the NRF.

A subscribe-notify NF service allows an NFc to subscribe the service of the NF service producer, for instance NFp 122. The subscription request includes the notification endpoint, as an URI where a notification of the service, such as an event notification, by the NFp is to be sent.

Figure 2:
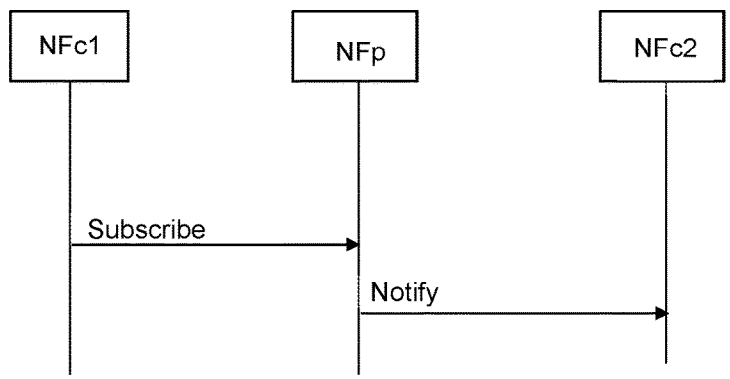
FIG. 2 illustrates a service subscribe procedure.

With reference to FIG. 2, a first NF service consumer, NFc1 may also subscribe to NF service offered by NFp on behalf of a second NF consumer, NFc2. A consumer of the subscribe/notify service, such as the NFc1, requests the NFp to send notifications to another consumer(s). In this case, NFc1 includes the notification endpoint of NFc2 in the subscribe request, on the basis of which the NFp may send notifications to the NFc2.

The subscribe-notify model also uses OAuth access tokens for authorizing service requests. Therefore, if NFc1 wants to send a subscribe request to NFp, then NRF, via OAuth procedures, first authorizes the NFc1 to send a subscribe request to NFp.

In the case of FIG. 2, NFc1 sends the subscribe request along with the access token received by the NRF. After the token/claim(s) thereof is verified by the NFp, the NFp can send a notification to NFc1 without asking any authorization. However, in FIG. 2, NFp sends notifications to NFc2, and there are security challenges with current procedures. For example, if NFc1 is malicious then it will add NFc2 ID towards NFp and NRF. However, it may add another entity, NFc2', URI (e.g. the address of a malicious entity to collect data) to receive the notification data. NRF authorizes NFp to send the data to NFc2, but as the URI belongs to NFc2', the NFp will send data to the malicious NFc2'. Another problem is that a malicious NFc1 may also raise a DoS attack towards the NFc2.

There are now provided improvements for addressing these problems. New functionality is introduced facilitating, before starting to send notifications by an NFc to a (second) service consuming and receiving NFc2 according to a subscribe request from a service (requesting first) NFc1, to validate a notification address of the subscribe request and confirm if the NFc2 is willing to accept traffic/data from the NFc. A new service, which may be referred to as a receiving data authorization service, may be specified for verifying the notification address and notification acceptance.

Figure 3:
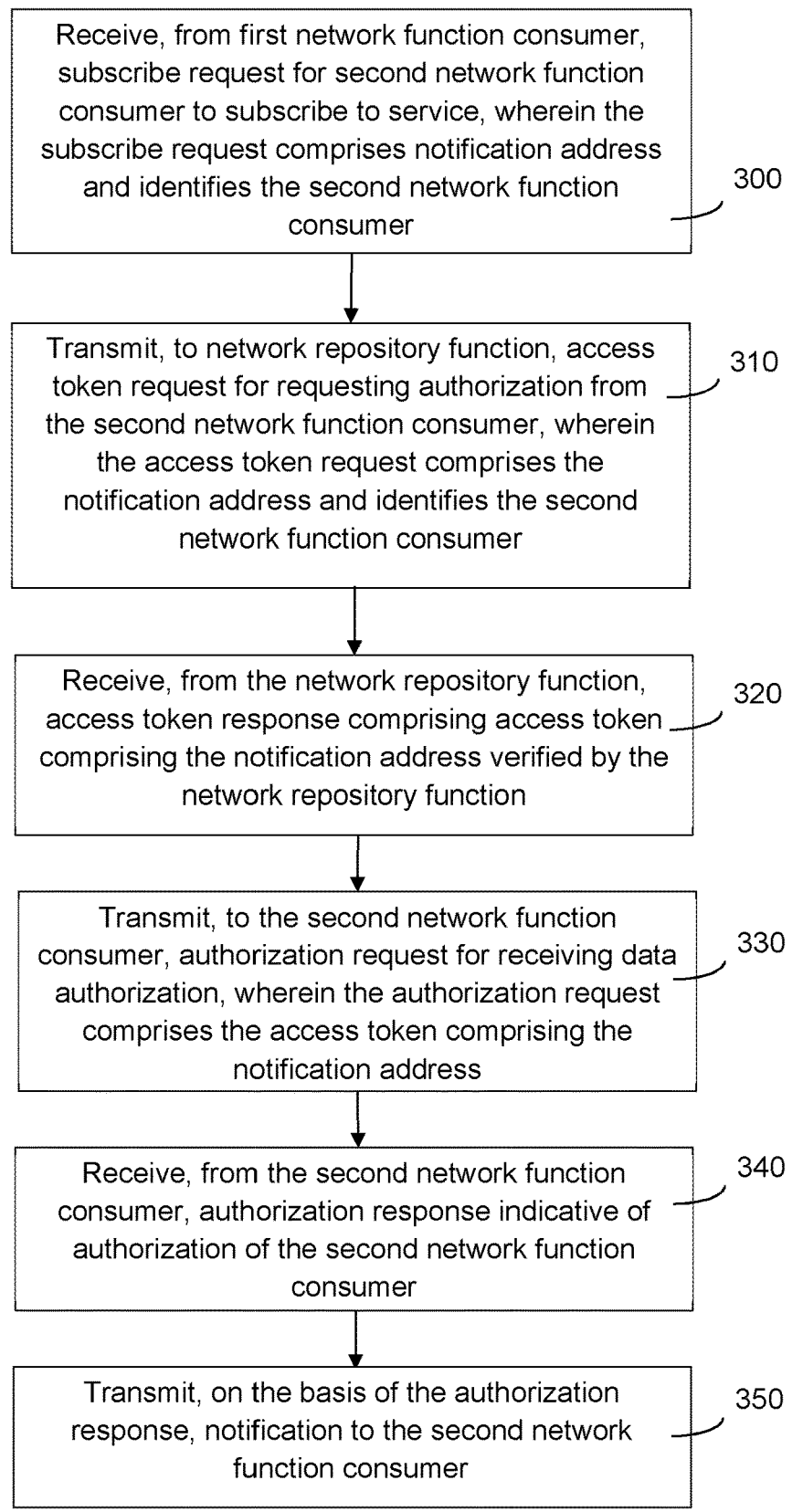
FIGS. 3 to 5 illustrate methods in accordance with at least some embodiments.

FIG. 3 illustrates a method, for controlling a network function service subscribe procedure. The method may be performed by a network function service provider network entity, referred to below also as NFp, in some embodiments 3GPP SBA NFp (e.g. the NFp 122), or in a control device configured to control the functioning thereof.

Block 300 comprises receiving, from a first network function consumer, referred to below as NFc1, a subscribe request for, or on behalf of, a second network function consumer, referred to below as NFc2, to subscribe to a service. The subscribe request comprises a notification address and identifies the NFc2. Thus, the NFc1 may transmit the subscribe request on behalf of the NFc2, to subscribe to an NF service provided by the NFp performing the method. For example, the notification address may be an URI, such as a notification URI, and NFc2 (and NFc1) may be identified by their respective NF instance identifier or identity (instanceID).

Block 310 comprises transmitting, to a network repository function, referred to below as NRF, an access token request for an access token for requesting authorization from the NFc2. The access token request comprises the notification address and identifies the NFc2.

Block 320 comprises receiving, from the NRF, an access token response comprising an access token comprising the notification address verified by the NRF. The access token is received from the NRF if the NRF verifies the notification address transmitted in block 310 to belong to the NFc2. The received notification address, such as a callback URI, may be stored and used later for transmitting notifications to the NFc2 (at block 350).

Block 330 comprises transmitting, to the NFc2, an authorization request for receiving data authorization, wherein the authorization request comprises the access token received in block 320 and comprising the notification address. The authorization request is to confirm if the NFc2 authorizes at least some data reception from the network function producer based on the subscribe request, in some embodiments notifications of a 3GPP SBA subscribe-notify mechanism. The authorization request may identify a receiving data authorization service.

Block 340 comprises receiving, from the NFc2, an authorization response indicative of authorization of the NFc2.

Block 350 comprises transmitting, on the basis of the authorization response, a notification to the NFc2. Hence, block 350 may be entered if the NFc2 has approved data reception and notifications from the NFp and the authorization response indicates approval of the authorization request.

Figure 4:
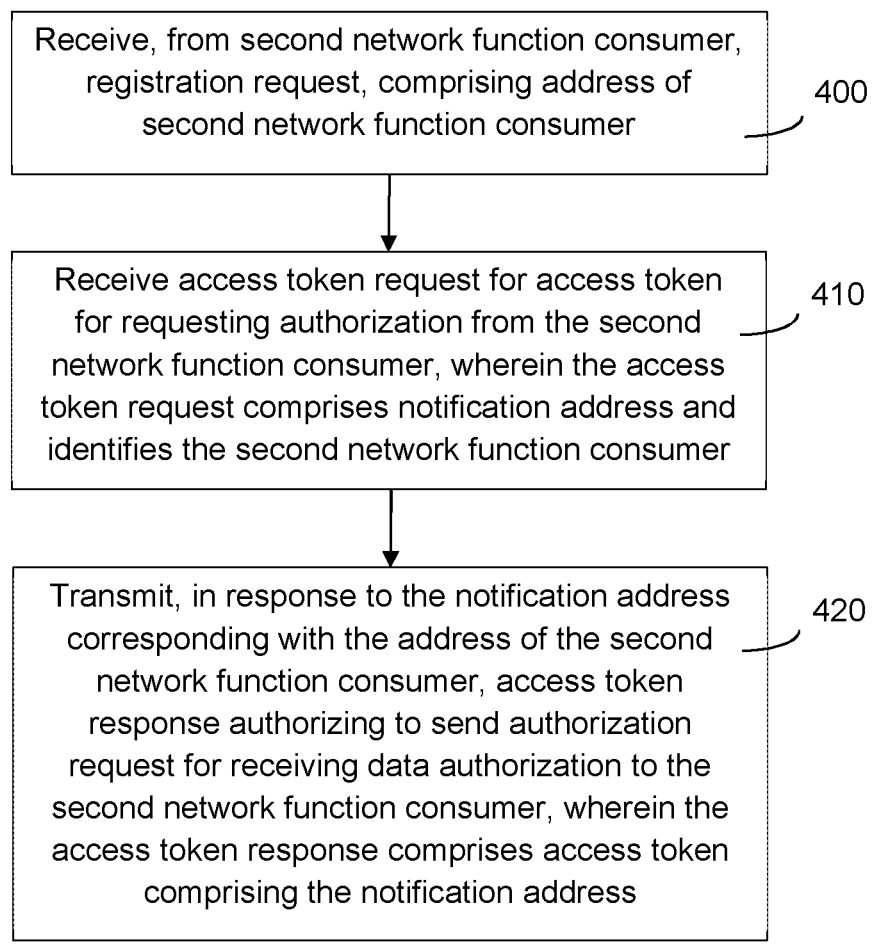

FIG. 4 illustrates a method for access token control. The method may be performed by a service access authorization network entity, referred to below as network repository function or NRF, in some embodiments 3GPP SBA NRF (e.g. the NRF 140 or 142), or in a control device configured to control the functioning thereof.

Block 400 comprises receiving, from an NFc2, a registration request, comprising an address of the NFc2. The registration request may be for a specific service to confirm if the NFc2 authorizes data reception from a network function producer, and transmitted 500 by an NF performing the method of FIG. 5. The service may be referred to as a receiving data authorization service, and the address may be an URI of the NFc2. NFc2 service or profile information may be generated or updated based on the received information, with the address of the NFc2 being associated with identity information of the NFc2, and stored for subsequent use.

Block 410 comprises receiving an access token request, wherein the access token request comprises a notification address and identifies the NFc2. The request may transmitted 310 by the NFp performing the method of FIG. 3. The request may be for an access token for requesting authorization from the NFc2. Depending on the applied embodiment, the access token request may be received from an NFp or the NFc1.

Block 420 comprises transmitting, in response to the notification address corresponding with the address of the NFc2, an access token response authorizing to send an authorization request for receiving data authorization to the NFc2. The access token response comprises an access token comprising the notification address. The NRF may thus retrieve the address registered in block 400 based on NFc2 identity information in the request and determine if the received notification address corresponding with the registered address (e.g. notification URI) of the NFc2. If yes, the NRF may generate the access token and enter block 420. If no, the NRF may transmit an access token response without an access token and indicative of rejection of the access token request 410.

Figure 5:
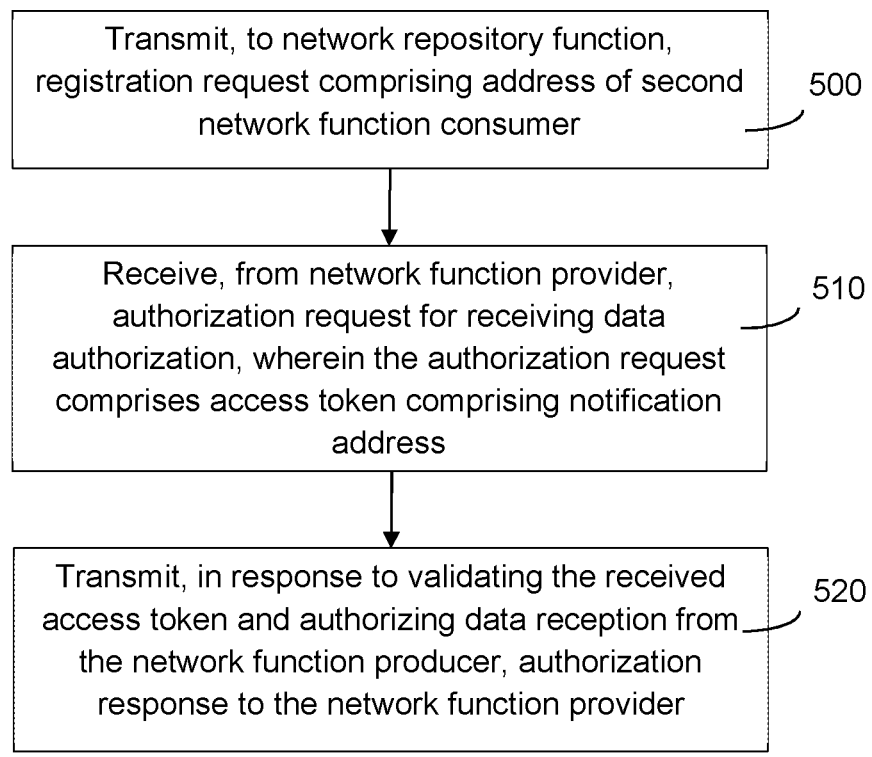

FIG. 5 illustrates a method for authorizing data reception and/or notifications, regarding a service provided by an NFp. The method may be performed by a (service consuming) network entity, which itself has not subscribed to a service by the NFp, but for which service the NFc1 has requested subscription on behalf of the entity. The entity performing the method of FIG. 5 is referred to below as the NFc2, in some embodiments 3GPP SBA NFc (e.g. the NFc 120), or in a control device configured to control the functioning thereof.

Block 500 comprises transmitting, to an NRF, a registration request. The registration request comprises an address of an NFc2. The registration request may be the request received in block 400, and may identify the receiving data authorization service. The NFc2 may thus register all addresses supported by the NFc2, for which it is willing to receive data.

Block 510 comprises receiving, from an NFp, an authorization request for receiving data authorization. The authorization request comprises an access token, which may be transmitted by the NFp in block 330. The access token may comprise the notification address verified by the NRF in block 420 to correspond with the network address registered in block 500 and 400. The authorization request may be based on the subscribe request of block 300 by an NFc1 on behalf of the NFc2 to subscribe to a service by the NFp. The access token may be generated and transmitted 420 for the NFp by the NRF in response to an access token request from the NFp in response to the subscribe request.

Block 520 comprises transmitting, in response to validating the access token and authorizing data reception from the network function producer, an authorization response to the NFp. The NFc2 may perform one or more authorization checks to determine whether or not to accept the authorization request. The NFc2 may thus determine whether the access token is valid and indicate in the authorization response if data transmission/notifications to the NFc2 are allowed or not.

It will be appreciated that there are various further embodiments that may be applied in connection with some or all of the methods, and there may be further steps. Some embodiments are illustrated below, with references to example signalling chart of FIG. 6. Although example embodiments are illustrated here with references to 3GPP 5G SBA entities and/or with similarly named entities, the presently disclosed features may be applied also in other systems. For example, the network repository function may refer to a (network function) authorization entity, the network function consumer to a network entity using or consuming a service, and the network function producer to a service-providing network entity. Further, an embodiment illustrated in connection with FIG. 6 may be applied in separation from other illustrated embodiments.

The NFc2 transmits a registration request, in the present example Register NFc Service message 600 to the NRF. This request is used to register the NFc2 with the receiving data authorization service at the NRF. This service provides an API to validate if the respective NF NFc2 is willing to receive the data from an authorized NF (NFp). The request comprises at least one address belonging to the NFc2, such as IP URI and/or fully qualified domain name (FQDN) based URI(s) belonging to the NFc2. The NRF creates or updates NF profile information of the NFc2 to include the received information and transmit a response message 602.

In some embodiments, the NFc1 requests an access token from the NRF to send the subscribe request 300 to the NFp, on behalf of an NFc2 to subscribe to the service by the NFp.

If the NFc1 is authorized for service by the NFp, the NRF includes an access token in an access token response, and the NFc1 includes the received access token in the subscribe message. Depending on the applied embodiment, this (other) access token preceding the access token of blocks 320, 330, 420, 520 may authorize the NFc1, or the NFc1 and the NFc2, to receive data from the NFp.

Figure 6:
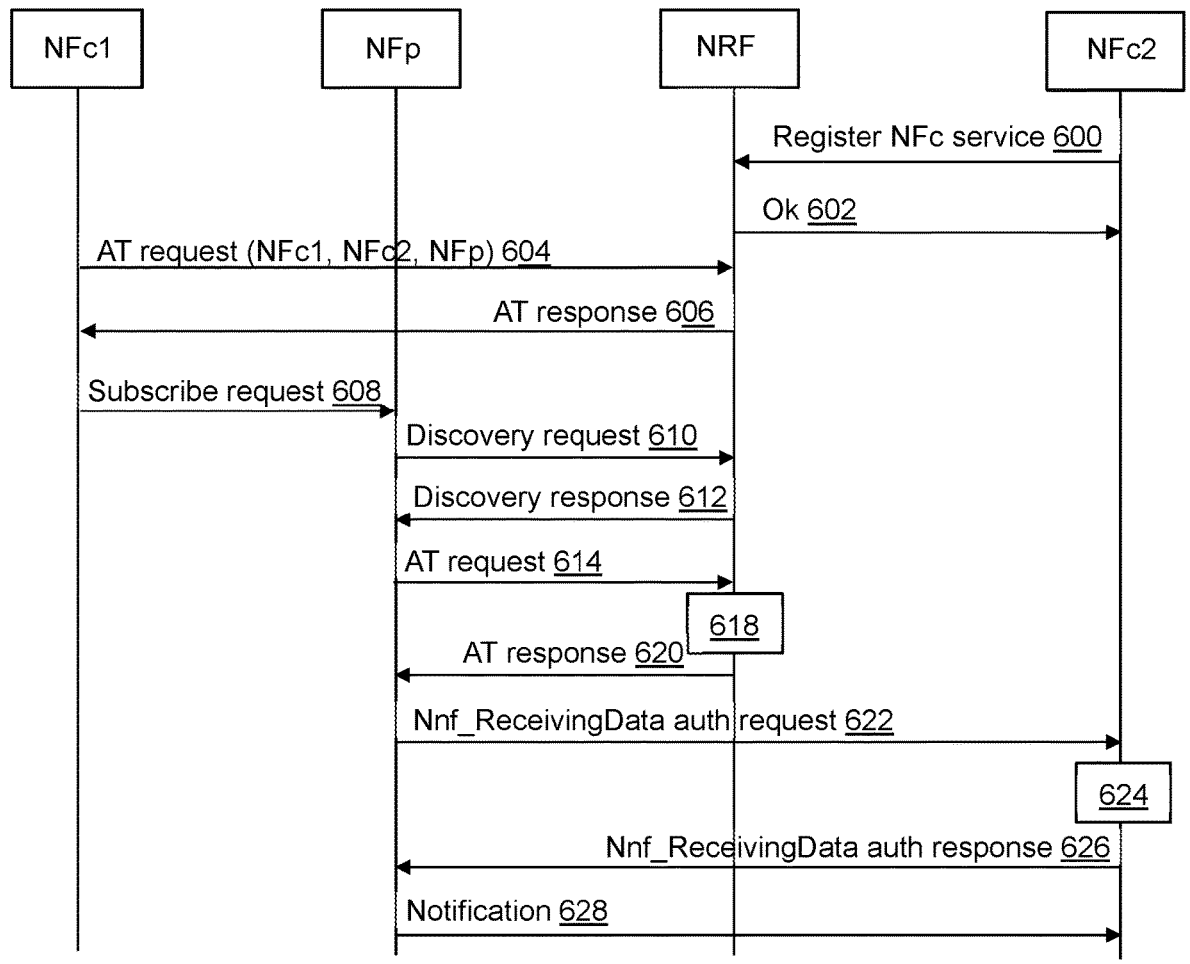
FIG. 6 illustrates signalling in accordance with at least some embodiments.

In the example of FIG. 6, the NFc1 may determine to subscribe to an NF service of the NFp on behalf of the NFc2. Thus, the NFc1 may determine that there is a need to perform delegated subscription on behalf of the NFc2. The NFc1 thus transmits an access token, referred to as AT in FIG. 6, request 604 to the NFp, to request authorization and access token for receiving data from the NFp. The AT request 604 comprises an identifier of NFc1, and identifier of NFc2, and an identifier of the NFp.

In response to the NFc1 and NFc2 being permitted to access the NF service by the NFp, the NRF authorizes the NFc1 and NFc2 to receive data from the NFp. This may also implicitly authorize the NFp to send data to the NFc1 and NFc2. The authorization may be performed and decided based on preconfigured policy of the respective NF NRF, according to policy of the serving operator, and/or inter-operator agreement. If the NFc1 does not send the NFc2 information in AT request 604, then the access token in the response 606 will only authorize NFc1 (and not NFc2) to receive notification from NFp. The NFc2 details may in this case be sent in response to the subsequent access token request 614.

Upon receiving the access token in the AT response 606, the NFc1 transmits a Subscribe request 608 to NFp. The request 608 includes additional NF (NFc2) details where data is to be sent by NFp. The request may include NFc2 identifier, the notification address (which may be an NFc2 URI), and the access token received from the NRF in message 606.

The NFp may perform a network function discovery with the NRF for a receiving data authorization service in response to the subscribe request. A discovery request 610 may identify the receiving data authorization as the service to be discovered. Based on the registration of the receiving data authorization service based on message 600 by the NFc2, the NRF transmits a discovery response 612 comprising information of the discovered NF instance NFc2 associated with the receiving authorization service. The information may include the address(es) of the NFc2. The NFp transmit the access token request after performing the network function discovery, wherein the access token request identifies the receiving data authorization service.

The subscribe request 608 may comprise NF identity of the NFc2 and the notification address by uniform resource identifier(s) to identify a receiver of notifications from the network function producer.

The subscribe request 608 may comprise the access token granted by the NRF based on the AT request 604 and included in the AT response 606. The access token may be indicative of authorization of the NRF for the NFc1, or in another embodiment, the NFc1 and the NFc2, to receive data from the network function producer. The access token (claims) may identify NFc1 and NFc2 as consumers and NFc as producer. The received access token may be validated by the NFp. This may be performed after the discovery, or already before the discovery. In response to successfully validating the received access token, the NFp may allow NFc1 (or the NFc1 and the NFc2) to receive data from the NFp.

However, NFp is not aware if URI provided as the notification address in the subscribe request 608 really belongs to the NFc2. For this purpose, it transmits the access token request 614.

The access token request may be transmitted (in block 310) 614 after validating the access token received in the subscribe request 608 (in block 300). Thus, depending if the access token is valid, the NFp may transmit the AT request 614, or a response to the subscribe request to the NFc1, indicative of rejection of the request.

If the access token in the request 608 is valid, NFp hence transmits an AT request 614 to the NRF. The AT request 614 may comprise:
Source NF sending a URI=NFc1
Consumer NF=NFp
Producer NF=NFc2
Notification Receiving NF URI=NFc2 URI
Target service name=Receiving Data Auth The AT request 614 (as well as 604) may comprise client credentials of the respective NF (NFp or NFc1), which the NRF validates as a condition for accepting the AT request and access token generation, in some embodiments according to the OAuth 2.0 procedure. As indicated earlier, the (first and second) access tokens are cryptographically signed by the NRF and the access token validation may comprise verifying the signature.

Based on NFc2 registration information, the NRF verifies 618 if the URI received in AT request 614 is really belonging to the NFc2. If the received URI corresponds with the URI registered by the registration request 600, the NRF may authorize the request, generate the access token and transmit the AT response 620 comprising the generated access token (as in block 420) to the NFp.

The NRF may further in block 618 (or as separate block(s)) verify, as further precondition for generating the access token, if the NFc is authorized to receive notifications from NFp and/or verify if NFp is authorized to access service of NFc2. The authorization may be performed and decided based on preconfigured policy of the respective NF NRF, according to policy of the serving operator, and/or inter-operator agreement.

In case the notification address does not correspond with the registered address/URI of the NFc2, the AT request is rejected, and no access token for requesting receiving data authorization is transmitted to the NFp. Hence, the subscribe request as requested by message 608 is rejected, and the NFp may inform NFc1 accordingly.

The access token in the AT response 620 may comprise claims specifying:
Source NF sending a URI=NFc1
Consumer NF=NFp
Producer NF=NFc2
Notification Receiving NF URI=NFc2 URI Upon receiving the AT response indicative of approval of the request and comprising the access token, the NFp transmits an authorization request 622 (for receiving data authorization), in the example of FIG. 6 Nnf_ReceivingData auth request to the NFc2. The request 622 comprises the access token received in message 620 from the NRF. The access token may thus specify NFc2 URI as the Notification Receiving NF URI, and identify the source NF (i.e. NFc1) which is using the NFc2 URI.

The NFc2 processes the received request in block 624 and determines if it authorizes the request, including validating the access token as a precondition for accepting the authorisation request. In the present example, the NFc2 admits to receive notifications from the NFp according to the authorization request.

For example, if the NFc2 has established a previous subscription to NFc1, or if NFc1 is based on operator policy allowed to use NFc2 URI, the NFc2 may authorize data reception. If not, the request is rejected. Further, block 624 may comprise verifying the Notification Receiving NF URI of the request 622. If this URI does not match with the URI of the NFc2, the received request 622 is rejected.

In the example of FIG. 6, the NFc2 transmit an Nnf ReceivingData auth response 626 to the NFp. If the response 626 indicates approval of the request and thus authorization data reception from the network function producer, the NFp may establish service provision for the NFc2 in accordance with the subscribe request 608. The NFp may thus start to send notification(s) 628 to the NFc2. If the authorization response indicates rejection, the NFp may send a subscribe response indicating refusal to the NFc1.

Figure 7:
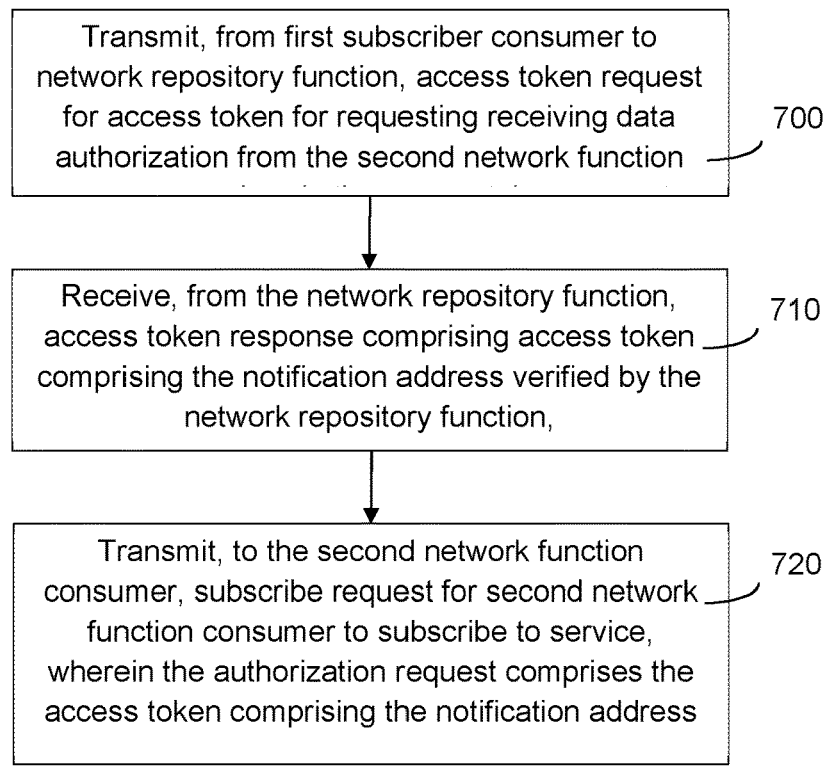
FIG. 7 illustrates a method in accordance with at least some embodiments.

In an embodiment partially differing from the example of FIG. 6, as illustrated in connection with FIG. 7, the NFc1 may transmit 700 to the NRF an access token request for access token for requesting receiving data authorization from the NFc2. The access token request may identify NFc1, NFc2, and NFp. The access token request may also include the notification address (which may refer to the URI of the NFc2) where the NFp needs to send notifications. The NRF may perform the method of FIG. 4. The NRF may authorize the NFc1 and NFc2 to receive data from the NFp and implicitly, the NFp is authorized to send data to NFc1 and NFc2. Further, the NRF may also verify using the NFc2 registration data, if the received notification address, e.g. URI is actually belonging to NFc2. If yes, the NRF may conclude verifying and accepting the access token request, and also add the URI of the NFc2 in the access token claims.

The NFc1 receives 710 an access token response from the NRF, comprising the access token comprising the notification address verified by the NRF.

The NFc1 may then transmit 720 a service or subscribe request to the NFp with the access token. Upon validating the access token, the NFp may continue with block 330 and transmit the authorization request as illustrated above. Hence, the NFp may perform the method of FIG. 3, except blocks 310 and 320, and receive the access token in block 300. The NFc2 may perform the method of FIG. 5 (regardless if the access token is acquired by the NFc1 instead of the NFp) and operate similarly as illustrated in connection with FIG. 6.

It is to be noted that at least some of the above illustrated embodiments may also be applied to indirect communication. For example, this may be when the NFc1 only selects an NF set but delegates to the SCP the discovery and selection of the NFp (to which the subscribe request is then transmitted) from the NF set.

Figure 8:
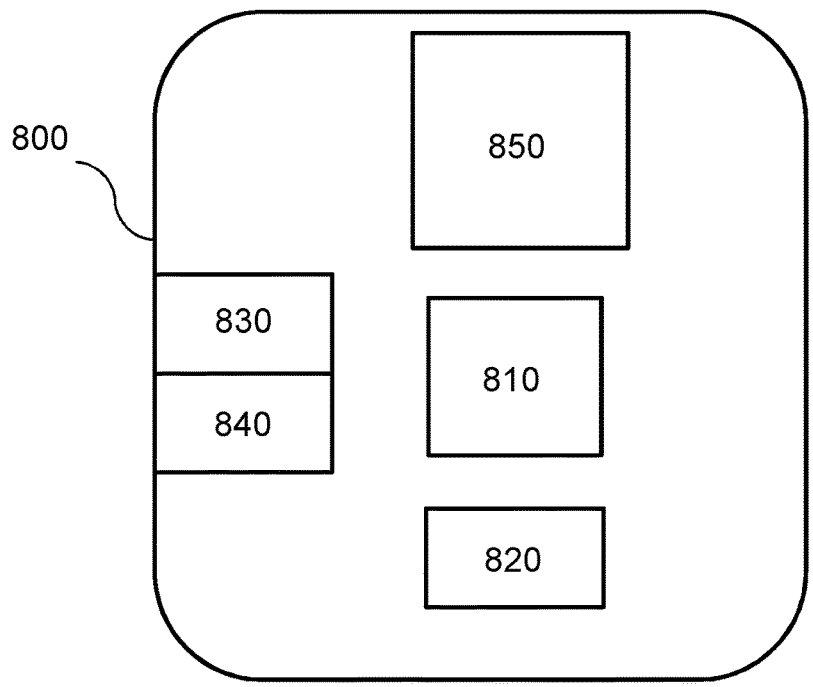
FIG. 8 is an example apparatus capable of supporting at least some embodiments.

FIG. 8 illustrates an example apparatus capable of supporting at least some embodiments of the present invention. Illustrated is device 800, which may comprise, for example, in applicable parts, a physical node running a NFc, an NFp, and/or an NRF, for example. The device may be configured to perform the method of FIG. 3, 4, 5, 7, or an embodiment thereof.

Comprised in device 800 is processor 810, which may comprise, for example, a single- or multi-core processor wherein a single-core processor comprises one processing core and a multi-core processor comprises more than one processing core. Processor 810 may comprise, in general, a control device. Processor 810 may comprise more than one processor. Processor 810 may be a control device. Processor 810 may comprise at least one application-specific integrated circuit, ASIC. Processor 810 may comprise at least one field-programmable gate array, FPGA. Processor 810 may be means for performing method steps in device 800, such as receiving, transmitting and/or providing, for example. Processor 810 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 800 may comprise memory 820. Memory 820 may comprise random-access memory and/or permanent memory. Memory 820 may comprise at least one RAM chip. Memory 820 may comprise solid-state, magnetic, optical and/or holographic memory, for example. Memory 820 may be at least in part accessible to processor 810. Memory 820 may be at least in part comprised in processor 810. Memory 820 may be means for storing information. Memory 820 may comprise computer instructions that processor 810 is configured to execute. When computer instructions configured to cause processor 810 to perform certain actions are stored in memory 820, and device 800 overall is configured to run under the direction of processor 810 using computer instructions from memory 820, processor 810 and/or its at least one processing core may be considered to be configured to perform said certain actions. Memory 820 may be at least in part comprised in processor 810. Memory 820 may be at least in part external to device 800 but accessible to device 800.

Device 800 may comprise a transmitter 830. Device 800 may comprise a receiver 840. Transmitter 830 and receiver 840 may be configured to transmit and receive, respectively, information in accordance with at least one cellular or non-cellular standard. Transmitter 830 may comprise more than one transmitter. Receiver 840 may comprise more than one receiver. Transmitter 830 and/or receiver 840 may be configured to operate in accordance with a suitable messaging protocol.

Device 800 may comprise user interface, UI, 850. UI 850 may comprise at least one of a display, a keyboard and a touchscreen. A user may be able to operate device 800 via UI 850, for example to configure operating parameters, such as SCP service request handling related parameters.

Processor 810 may be furnished with a transmitter arranged to output information from processor 810, via electrical leads internal to device 800, to other devices comprised in device 800. Such a transmitter may comprise a serial bus transmitter arranged to, for example, output information via at least one electrical lead to memory 820 for storage therein. Alternatively, to a serial bus, the transmitter may comprise a parallel bus transmitter. Likewise, processor 810 may comprise a receiver arranged to receive information in processor 810, via electrical leads internal to device 800, from other devices comprised in device 800. Such a receiver may comprise a serial bus receiver arranged to, for example, receive information via at least one electrical lead from receiver 840 for processing in processor 810. Alternatively, to a serial bus, the receiver may comprise a parallel bus receiver. Device 800 may comprise further devices not illustrated in FIG. 8. In some embodiments, device 800 lacks at least one device described above.

Processor 810, memory 820, transmitter 830, receiver 840 and/or UI 850 may be interconnected by electrical leads internal to device 800 in a multitude of different ways. For example, each of the aforementioned devices may be separately connected to a master bus internal to device 800, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising at least one processing core, at least one memory including computer program code, the at least one memory and the computer program code being configured to, with the at least one processing core, cause the apparatus at least to:
   receive, from a first network function consumer, a subscribe request for a second network function consumer to subscribe to a service, wherein the subscribe request comprises a notification address and identifies the second network function consumer,
   transmit, to a network repository function, an access token request for an access token for requesting authorization from the second network function consumer, wherein the access token request comprises the notification address and identifies the second network function consumer,
   receive, from the network repository function, an access token response comprising an access token comprising the notification address verified by the network repository function,
   transmit, to the second network function consumer, an authorization request for receiving data authorization, wherein the authorization request comprises the access token comprising the notification address,
   receive, from the second network function consumer, an authorization response indicative of authorization of the second network function consumer, and
   transmit, on the basis of the authorization response, a notification to the second network function consumer.

2. The apparatus according to claim 1, wherein the subscribe request comprises another access token, indicative of authorization of the network repository function for the first network function consumer, or the first network function consumer and the second network function consumer, to receive data from the network function producer, and the at least one memory and the computer program code are configured to, with the at least one processing core, cause the apparatus to transmit the access token request in response to validating the access token received in the subscribe request.

3. The apparatus according to claim 1, wherein the at least one memory and the computer program code are configured to, with the at least one processing core, cause the apparatus to perform a network function discovery with the network repository function to discover a receiving data authorization service in response to the subscribe request, and apparatus is configured to transmit the access token request after performing the network function discovery, wherein the access token request identifies the receiving data authorization service.

4. An apparatus comprising at least one processing core, at least one memory including computer program code, the at least one memory and the computer program code being configured to, with the at least one processing core, cause the apparatus at least to:
  receive, from a second network function consumer, a registration request, wherein the registration request comprises an address of the second network function consumer,
  receive an access token request from a network function provider or the first network function consumer, wherein the access token request comprises a notification address and identifies the second network function consumer, and
  transmit, in response to the notification address corresponding with the address of the second network function consumer, an access token response to the network function provider or the first network function consumer, for authorizing to send an authorization request for receiving data authorization to the second network function consumer, wherein the access token response comprises an access token comprising the notification address.

5. The apparatus according to claim 4, wherein the at least one memory and the computer program code are configured to, with the at least one processing core, cause the apparatus to:
  receive an access token request from the first network function consumer to send a subscribe request to the network function producer on behalf of a second network function consumer to subscribe to a service,
  authorize the first network function consumer or the first network function consumer and the second network function consumer to send the subscribe request to the network function producer, and
  transmit an access token response to the first network consumer in response to the authorization to send the subscribe request, comprising an access token for the subscribe request.

6. An apparatus comprising at least one processing core, at least one memory including computer program code, the at least one memory and the computer program code being configured to, with the at least one processing core, cause the apparatus at least to:
  transmit, from a first subscriber consumer to a network repository function, an access token request for an access token for requesting receiving data authorization from the second network function consumer, wherein the access token request comprises a notification address and identifies the second network function consumer,
  receive, from the network repository function, an access token response comprising an access token comprising the notification address verified by the network repository function,
  transmit, to the second network function consumer, a subscribe request for a second network function consumer to subscribe to a service, wherein the authorization request comprises the access token comprising the notification address.

7. The apparatus according to any preceding claim 6, wherein the subscribe request comprises a network function identity of the second network function consumer and the notification address as a uniform resource identifier to identify a receiver of notifications from the network function producer.

8. An apparatus comprising at least one processing core, at least one memory including computer program code, the at least one memory and the computer program code being configured to, with the at least one processing core, cause the apparatus at least to:
  transmit, to a network repository function, a registration request, wherein the registration request comprises an address of a second network function consumer,
  receive, from a network function provider, an authorization request for receiving data authorization, wherein the authorization request comprises an access token comprising a notification address, and
  transmit, in response to validating the access token and authorizing data reception from the network function producer, an authorization response to the network function provider.

9. The apparatus according to claim 8, wherein performing the authorization of the data reception comprises checking if the second network function consumer has a subscription to the first network function consumer and/or checking if the first network function consumer is allowed to use a uniform resource identifier of the second network function consumer.

10. The apparatus according to claim 8, wherein the authorization request identifies a receiving data authorization service, and
the access token comprising the notification address identifies at least some of:
  the first network function consumer as a source of the uniform resource identifier of the second network function consumer,
  the network function provider as a consuming network function for the receiving data authorization service,
  the second network function consumer as a producing network function for the receiving data authorization service, and
  a uniform resource identifier of the second network function consumer as the notification address to identify a notification receiving network function.

11. A method, comprising:
  receiving, from a first network function consumer, a subscribe request for a second network function consumer to subscribe to a service, wherein the subscribe request comprises a notification address and identifies the second network function consumer,
  transmitting, to a network repository function, an access token request for an access token for requesting authorization from the second network function consumer, wherein the access token request comprises the notification address and identifies the second network function consumer,
  receiving, from the network repository function, an access token response comprising an access token comprising the notification address verified by the network repository function, transmitting, to the second network function consumer, an authorization request for receiving data authorization, wherein the authorization request comprises the access token comprising the notification address, receiving, from the second network function consumer, an authorization response indicative of authorization of the second network function consumer, and transmitting, on the basis of the authorization response, a notification to the second network function consumer.

12. The method according to claim 11, wherein the subscribe request comprises another access token, indicative of authorization of the network repository function for the first network function consumer, or the first network function consumer and the second network function consumer, to receive data from the network function producer, and the access token request is transmitted in response to validating the access token received in the subscribe request.

13. The method according to claim 11, wherein a network function discovery is performed with the network repository function to discover a receiving data authorization service in response to the subscribe request, and apparatus is configured to transmit the access token request after performing the network function discovery, wherein the access token request identifies the receiving data authorization service.

14. The method according to claim 11, wherein the authorization request identifies a receiving data authorization service, and the access token comprising the notification address identifies at least some of:
the first network function consumer as a source of the uniform resource identifier of the second network function consumer,
the network function provider as a consuming network function for the receiving data authorization service,
the second network function consumer as a producing network function for the receiving data authorization service, and
a uniform resource identifier of the second network function consumer as the notification address to identify a notification receiving network function.

15. A method, comprising:
receiving, from a second network function consumer, a registration request, wherein the registration request comprises an address of the second network function consumer, receiving an access token request from a network function provider or the first network function consumer, wherein the access token request comprises a notification address and identifies the second network function consumer, and transmitting, in response to the notification address corresponding with the address of the second network function consumer, an access token response to the network function provider or the first network function consumer, for authorizing to send an authorization request for receiving data authorization to the second network function consumer, wherein the access token response comprises an access token comprising the notification address.

16. The method according to claim 15, further comprising:
receiving an access token request from the first network function consumer to send a subscribe request to the network function producer on behalf of a second network function consumer to subscribe to a service, authorizing the first network function consumer or the first network function consumer and the second network function consumer to send the subscribe request to the network function producer, and transmitting an access token response to the first network consumer in response to the authorization to send the subscribe request, comprising an access token for the subscribe request.

17. A method, comprising:
transmitting, from a first subscriber consumer to a network repository function, an access token request for an access token for requesting receiving data authorization from the second network function consumer, wherein the access token request comprises a notification address and identifies the second network function consumer, receiving, from the network repository function, an access token response comprising an access token comprising the notification address verified by the network repository function, and transmitting, to the second network function consumer, a subscribe request for a second network function consumer to subscribe to a service, wherein the authorization request comprises the access token comprising the notification address.

18. The method according to claim 17, wherein the subscribe request comprises a network function identity of the second network function consumer and the notification address as a uniform resource identifier to identify a receiver of notifications from the network function producer.

19. A method, comprising:
transmitting, to a network repository function, a registration request, wherein the registration request comprises an address of a second network function consumer, receiving, from a network function provider, an authorization request for receiving data authorization, wherein the authorization request comprises an access token comprising a notification address, and transmitting, in response to validating the access token and authorizing data reception from the network function producer, an authorization response to the network function provider.

20. The method according to claim 19, wherein performing the authorization of the data reception comprises checking if the second network function consumer has a subscription to the first network function consumer and/or checking if the first network function consumer is allowed to use uniform resource identifier of the second network function consumer.

* * * * *